United States Patent [19]
Stephens et al.

[11] Patent Number: 6,017,088
[45] Date of Patent: *Jan. 25, 2000

[54] CONVERTIBLE INFANT CARRIER/RESTRAINT SYSTEM

[75] Inventors: William B. Stephens, Boulder; Brian P. Egan, Thornton, both of Colo.

[73] Assignee: Evenflo Company, Inc., Vandalia, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/775,078

[22] Filed: Dec. 27, 1996

[51] Int. Cl.⁷ ........................................................ A47C 1/11
[52] U.S. Cl. ........................ 297/256.16; 297/130; 292/50
[58] Field of Search ............................ 297/256.16, 130, 297/250.1, 217.7, 256.17; 292/50, 225

[56] References Cited

U.S. PATENT DOCUMENTS

| | | |
|---|---|---|
| D. 315,453 | 3/1991 | Takada . |
| D. 325,132 | 4/1992 | Cone . |
| D. 336,396 | 6/1993 | Freese et al. . |
| D. 338,343 | 8/1993 | Grange . |
| D. 347,737 | 6/1994 | Allard et al. . |
| D. 353,057 | 12/1994 | Koyanagi et al. . |
| D. 355,986 | 3/1995 | Myers . |
| D. 361,743 | 8/1995 | Matsumoto et al. . |
| D. 369,911 | 5/1996 | Turner . |
| 620,220 | 2/1899 | Brandt . |
| 1,035,642 | 8/1912 | Rosse . |
| 1,328,832 | 1/1920 | Hanrath . |
| 1,557,263 | 10/1925 | Millen . |
| 1,807,267 | 5/1931 | Winship . |
| 2,324,421 | 7/1943 | Ouellette . |
| 2,675,860 | 4/1954 | Schroeder . |
| 3,409,325 | 11/1968 | Hamilton et al. . |
| 3,709,558 | 1/1973 | Jakob . |
| 3,804,459 | 4/1974 | Nose . |
| 3,857,604 | 12/1974 | Scott . |
| 3,910,634 | 10/1975 | Morris . |
| 4,194,601 | 3/1980 | Yellin . |
| 4,205,877 | 6/1980 | Ettridge . |
| 4,274,674 | 6/1981 | Deloustal . |
| 4,324,430 | 4/1982 | Dimas, Jr. et al. . |
| 4,371,206 | 2/1983 | Johnson, Jr. . |
| 4,436,341 | 3/1984 | Converse . |
| 4,545,613 | 10/1985 | Martel et al. . |
| 4,613,188 | 9/1986 | Tsuge et al. . |
| 4,616,878 | 10/1986 | Fohl . |
| 4,634,175 | 1/1987 | Wise . |
| 4,634,177 | 1/1987 | Meeker . |
| 4,685,741 | 8/1987 | Tsuge et al. . |
| 4,687,255 | 8/1987 | Klanner et al. . |
| 4,688,850 | 8/1987 | Brownlie et al. . |
| 4,711,490 | 12/1987 | Brand . |
| 4,718,715 | 1/1988 | Ho . |
| 4,729,600 | 3/1988 | Single, II et al. . |
| 4,733,909 | 3/1988 | Single, II et al. . |
| 4,746,165 | 5/1988 | Fuerst et al. . |
| 4,754,999 | 7/1988 | Kain . |

(List continued on next page.)

FOREIGN PATENT DOCUMENTS

| | | |
|---|---|---|
| 0 609 890 A1 | 2/1994 | European Pat. Off. . |
| 0 609 889 A1 | 8/1994 | European Pat. Off. . |
| WO 94/26152 | 11/1994 | WIPO . |

*Primary Examiner*—Anthony D. Barfield
*Attorney, Agent, or Firm*—Robert G. Crouch; Holland & Hart LLP

[57] ABSTRACT

An infant restraint system including an infant carrier, a base couplable to the infant carrier via an improved locking mechanism and having an improved recline mechanism. The infant restraint system further includes an improved handle and an improved belt system, the belt system having a mid-belt adjuster disposed in front of the infant when the infant is positioned in the infant restraint system.

7 Claims, 9 Drawing Sheets

U.S. PATENT DOCUMENTS

| | | |
|---|---|---|
| 4,786,081 | 11/1988 | Schmidt . |
| 4,826,246 | 5/1989 | Meeker . |
| 4,834,420 | 5/1989 | Sankrithi et al. . |
| 4,861,105 | 8/1989 | Merten et al. . |
| 4,872,704 | 10/1989 | Biller et al. . |
| 4,880,277 | 11/1989 | Takahashi et al. . |
| 4,943,113 | 7/1990 | Meeker . |
| 4,958,887 | 9/1990 | Meeker ............... 297/256.17 |
| 4,979,777 | 12/1990 | Takada . |
| 4,984,845 | 1/1991 | Knoedler et al. . |
| 4,998,307 | 3/1991 | Cone . |
| 5,050,907 | 9/1991 | Boumarafi et al. . |
| 5,052,750 | 10/1991 | Takahashi et al. . |
| 5,056,865 | 10/1991 | Sedlack ............... 297/256.17 |
| 5,061,012 | 10/1991 | Parker et al. . |
| 5,125,717 | 6/1992 | Skold et al. . |
| 5,143,419 | 9/1992 | Tepper et al. . |
| 5,158,337 | 10/1992 | Leggett . |
| 5,207,476 | 5/1993 | Payne . |
| 5,207,478 | 5/1993 | Freese et al. . |
| 5,228,745 | 7/1993 | Hazel . |
| 5,230,523 | 7/1993 | Wilhelm . |
| 5,236,221 | 8/1993 | Minami . |
| 5,265,908 | 11/1993 | Verellen et al. . |
| 5,277,472 | 1/1994 | Freese et al. . |
| 5,286,090 | 2/1994 | Templin et al. . |
| 5,303,979 | 4/1994 | Koyanagi et al. . |
| 5,322,343 | 6/1994 | Parker et al. . |
| 5,324,094 | 6/1994 | Kain . |
| 5,335,964 | 8/1994 | Sedlack et al. . |
| 5,366,271 | 11/1994 | Johnston et al. . |
| 5,370,441 | 12/1994 | Chuang . |
| 5,385,387 | 1/1995 | Kain . |
| 5,409,292 | 4/1995 | Kain et al. . |
| 5,413,401 | 5/1995 | Koyanagi . |
| 5,458,398 | 10/1995 | Meeker et al. . |
| 5,462,333 | 10/1995 | Beauvais . |
| 5,466,044 | 11/1995 | Barley et al. . |
| 5,478,135 | 12/1995 | Kain . |
| 5,487,588 | 1/1996 | Burleigh et al. . |
| 5,516,190 | 5/1996 | Kain et al. . |
| 5,527,094 | 6/1996 | Hiramatsu et al. . |
| 5,544,935 | 8/1996 | Cone, II et al. . |
| 5,551,751 | 9/1996 | Sedlack et al. . |
| 5,567,008 | 10/1996 | Cone, II . |
| 5,575,530 | 11/1996 | Harper et al. . |
| 5,599,060 | 2/1997 | Stephens et al. . |
| 5,676,386 | 10/1997 | Huang ............... 297/256.16 |

CONVERTIBLE INFANT CARRIER/RESTRAINT SYSTEM

The present invention relates to an improved design for a convertible infant carrier/restraint system and, more particularly, to a convertible infant carrier/restraint system which has a detachable base with an improved interlock mechanism, an improved recline mechanism, improved handle assembly, improved adjustability and positioning of the infant restraint belts, and other improved comfort and convenience features.

BACKGROUND OF THE INVENTION

Infant restraint systems, commonly referred to as car seats, are well known and widely accepted as a necessary appliance for transporting infants in motor vehicles such as automobiles. Infant restraint systems generally include a molded plastic shell with a seat portion, a back portion, laterally opposed side wall portions, and a base portion for securing the system in place on the seat of the motor vehicle. Most infant restraint systems are unitary devices wherein the shell and the base portion are integrally formed together. Such systems are designed solely for use in motor vehicles and do not serve multiple functions, such as for transporting an infant when shopping or performing other activities.

A few designs, however, are intended to provide multiple functions and include separable seat-base combinations. One such design has an infant carrier with an aperture configured to engage a spring-mounted bolt on the base. Uncoupling is effected by rotating a handle located in front of the infant to a position wherein the uncoupling means may be within reach of the infant. Another design has a detachable base in which the release mechanism is located on either side of the carrier. To disengage the infant carrier from the base, the user grasps the sides of the carrier with both hands and then depresses two release buttons. This design has the obvious disadvantage that the release buttons require the use of two hands and therefore are not convenient to use and may be subject to sticking, particularly if baby food, formula or other matter becomes lodged within the release mechanism.

Another design has release mechanisms located at the front and rear and at both sides of the base. This design includes a hook at the foot end of the base, slots on the underside of the carrier for receiving corresponding posts on the sides of the base, and a handle at the head end of the base. Mounting of the infant carrier on the base requires positioning the foot of the carrier under the hook, and careful alignment of the posts and slots. To uncouple the carrier from the base, the user pulls the handle at the head end of the base, grasps the head end of the carrier and lifts it from the base, then manipulates the foot end of the carrier from under the hook. This design is complicated and inconvenient to use, since it requires careful alignment to engage the carrier and several cumbersome steps to remove the carrier from the base.

Conventional infant restraint systems, including the above-described convertible designs, generally provide a fixed, reclined position for the infant. It is desirable, however, to be able to adjust the angle of inclination of the carrier to adapt to different situations and to provide more comfortable support for the infant. Conventional infant restraint systems generally require external supports to prop the seat into the desired position. Several child restraint systems offer multiple positions, but these designs are generally complicated to use and expense to manufacture, and are generally not designed for use outside the motor vehicle.

Another important feature for any infant carrier, including convertible carrier/restraint systems, is a pivotable handle assembly. It is desirable that the handle be easily movable to a plurality of positions, including a storage position where the handle is located adjacent the carrier and a carrying position where the handle is located above the carrier. Various mechanisms have been proposed for positioning carrier handles in their desired positions. However, such mechanisms are typically complex and require an inordinate number of parts to effect their operation.

Another disadvantage associated with existing carrier handles is that they typically comprise three sides, i.e., a top surface and opposing vertical side walls. In these designs, the weight of the infant carrier and occupant is generally distributed between the two side walls. With the weight distributed in this manner, transporting the infant for any length of time in an alternate carrying position (such as by grasping the sides of the handle or supporting the carrier on the user's forearm) can cause considerable discomfort to the user.

Another issue with many infant carriers is the orientation of the handle grip relative to the user's body. Typically, the handle grip is positioned such that the palm of the user's hand is facing forward or backward. As one can readily appreciate, this is an awkward position for carrying an infant. With the hand in this position, the arm is turned in an unnatural position and can become easily fatigued. Several designs offer alternate handle grip positions, but these designs are generally difficult to manufacture or cumbersome to use.

Another issue relating to infant restraint systems is the location of the adjustment mechanism on the infant restraint belts. The infant restraint belts of the infant restraint system are typically manually adjusted to provide for the proper belt length depending on the size of the infant. As the infant grows, or as different infants use the infant restraint system, it is necessary to readjust the length of the belts. This is typically performed by manipulating belts and buckles on the back of the infant restraint system. Another difficulty presented by many designs is that it is difficult to thread the motor vehicle seat belt through the base of the infant restraint system.

It is against this background and the desire to solve the problems of the prior art that the present invention has been developed.

SUMMARY OF THE INVENTION

Accordingly, it is an object of the present invention to provide an infant restraint system having a detachable base that is convenient to use and simple in design.

It is also an object of the present invention to provide an infant restraint system which is capable of assuming a plurality of angular incline positions, and yet is convertible to an infant carrier and easy to use.

It is another object of the present invention to provide an infant carrier having a handle which is easily securable in a plurality of pivoted positions relative to the shell.

It is further an object of the present invention to provide a handle on an infant carrier which allows the user to carry the infant in a more comfortable and natural position such that the palm of the hand is facing the body, and is easy to manufacture and use.

It is still further an object of the present invention to provide infant restraint belts within an infant restraint system which are easily and conveniently adjustable to different sizes.

It is still further an object of the present invention to provide an infant restraint system with a means for easily and conveniently securing the base within the motor vehicle.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to an infant restraint system. The infant restraint system includes an infant carrier and a base couplable to the infant carrier to support the infant carrier on a support surface. The infant restraint system also includes a base recline adjustment member operatively associated with the base to allow the angle of the base relative to the support surface to be altered.

The base recline adjustment member may be pivotally attached to the base. The base recline adjustment member may include a wedge-shaped recline stand. The stand may be pivotally attached to the base. The base recline adjustment member may be disposed beneath the base. The base recline adjustment member may include a first portion engageable with a second portion of the base to selectively secure the base in one of a plurality of predetermined angles of inclination relative to the support surface. The base may include a recess area for receiving the base recline adjustment member therein.

The present invention is also directed to an infant restraint system including a support base, an infant carrier couplable to the base, a handle attached to the carrier, and a latching mechanism operatively disposed to detachably connect the carrier to the base, the latching mechanism being independent of the handle.

The latching mechanism may include an actuating portion located on the carrier. The support base may include a latching engagement site, and the latching mechanism may include a latching engagement member. The latching engagement member may be pivotally mounted and biased to engage the latching engagement site on the base. The actuating portion may be disposed on one end of the carrier, the latching engagement member may be disposed on a central portion of the carrier, the latching engagement site may be disposed on a central site of the base, and the actuating portion may be coupled to the latching engagement member to allow the latching engagement member to be actuated by the actuation portion. The actuating portion may be connected to the latching engagement member by an elongated, flexible coupling member. The coupling member may be an elongated sheet of plastic. The infant restraint system may include a second elongated, flexible coupling member. The latching engagement member may be biased toward an engaging position by a spring member.

The present invention is also directed to an infant restraint system which includes an infant carrier having a longitudinal axis and a handle attachable to the infant carrier, the handle including a grip portion disposed generally parallel to the longitudinal axis. The handle also includes a pivoting mechanism connecting the infant carrier to the handle for movement between two rest positions. The pivoting mechanism may be received in a recess disposed in one of the carrier or the handle, the recess permitting the handle to rotate when the handle if forced toward the pivoting mechanism and generally blocking the handle from pivoting when the handle is in one of the rest positions. The pivot mechanism may include a lock operable by moving the handle relative to the base to permit pivoting between the rest positions.

The present invention is also directed to a base for supporting a child safety system on a support surface. The base includes a first portion configured to engage the child safety system, and a second portion cooperating with the first portion, the second portion including a recline adjustment member to alter the angle of the first portion relative to the support surface.

The present invention is also directed to a method for adjusting the angle of inclination of a child restraint system on a support surface. The method includes providing a support base couplable to a child restraint system, and adjusting the angle of inclination of the support base relative to the support surface.

The adjusting step may include engaging a first coupling member on the support base with a second coupling member on a base recline member to position the support base at a predetermined angle relative to the support surface.

The present invention is also directed to a method for detaching an infant carrier having opposed ends from a support base. The method includes placing a first hand on a first end of the infant carrier, placing a second hand on a second end of the infant carrier, and actuating a latching mechanism with one hand. The latching mechanism uncouples the infant carrier from the support base.

The present invention is also directed to an infant restraining system which includes a base for supporting the infant restraint system above a support surface. The system also includes a means coupled to the support base for adjusting the angle of inclination of the support base relative to the support surface. The adjusting means may include means for tilting a support base relative to the support surface. The adjusting means may also include means for engaging a first coupling member on the support base with a second coupling member on a base recline member to position the support base at a predetermined angle relative to the support surface.

The present invention is also directed to an infant restraint system which includes an infant carrier having opposed ends, a handle connected to the carrier defining a first support surface for transporting the carrier. The infant restraint system also includes a first recess at one of the opposed ends defining a first gripping portion, and a second recess at the other of the opposed ends defining a second gripping portion, the first and second gripping portions together defining a second support surface for transporting the carrier.

The present invention is also directed to an infant restraint system having an infant carrier and a belt system cooperating with the infant carrier to restrain the infant in the infant restraint system. The belt system may include a main belt which loops over each shoulder of the infant. The main belt may also include a mid-belt adjuster for adjusting the length of the main belt, and the mid-belt adjuster may be disposed in front of the infant when the infant is positioned in the infant restraint system.

The present invention is also directed to an infant restraint system having an infant carrier, a base couplable to the infant carrier to support the infant carrier on a support surface, a base recline adjustment member operatively associated with the base to allow the angle of the base relative to the support surface to be altered, and a handle attachable to the infant carrier. The handle may include a pivoting mechanism connecting the infant carrier to the handle for movement between two rest positions. The pivoting mechanism may be received in a recess disposed in one of the carrier or handle, the recess permitting the handle to rotate when the handle if forced toward the pivoting mechanism and generally blocking the handle from pivoting when the handle is in one of the rest positions. The infant restraint system includes a latching mechanism operatively disposed to detachably connect the carrier to the base. The latching mechanism may be independent of the handle. The infant restraint system also includes a belt system cooperating with the infant carrier to restrain the infant in the infant restraint system. The belt system includes a main belt which loops over each shoulder of the infant. The belt system includes a mid-belt adjuster for adjusting the length of the main belt, the mid-belt adjuster may be disposed in front of the infant when positioned in the infant restraint system.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings

FIG. 17b is side view of the infant carrier/restraint system of FIG. 1, showing the infant carrier in a more upright position than the fully reclined position of FIG. 17a;

DETAILED DESCRIPTION OF THE PREFERRED EMBODIMENTS

Figure 1:
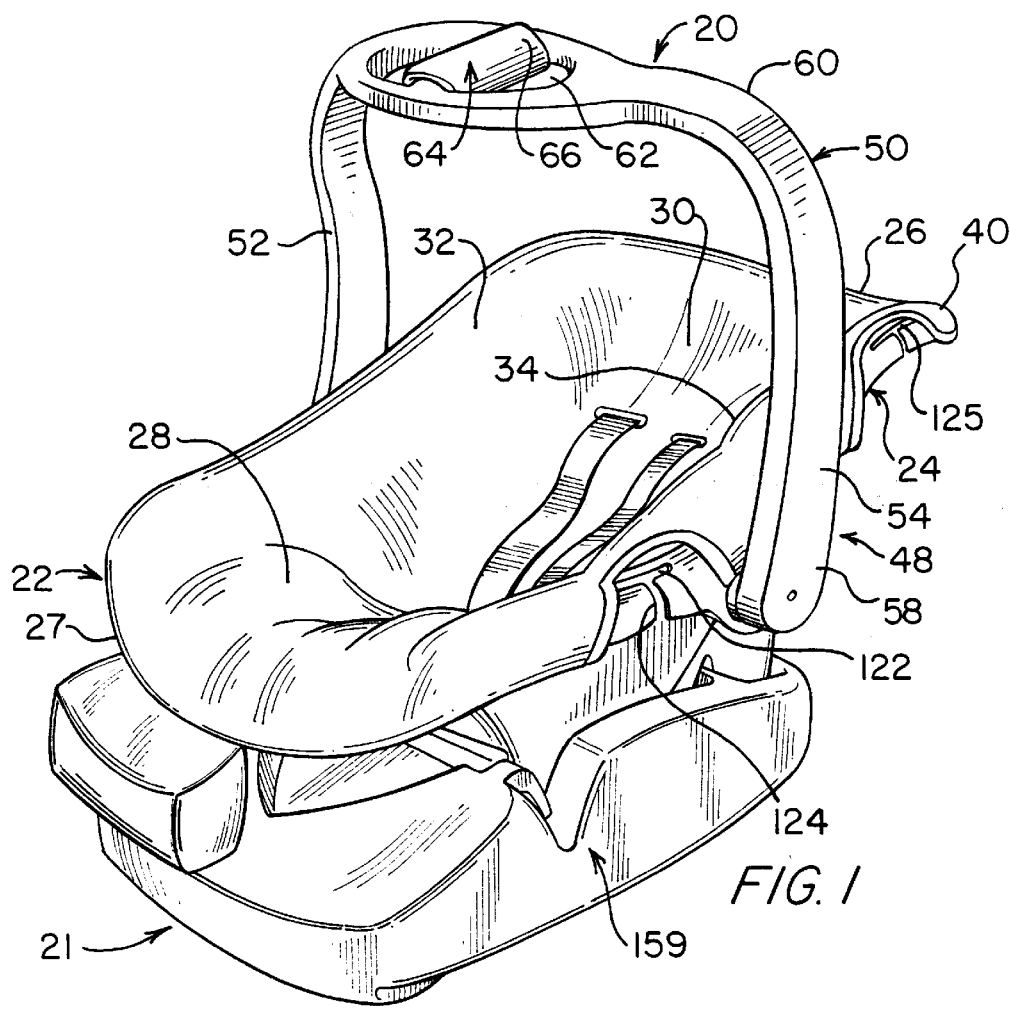
FIG. 1 is a perspective view of a convertible infant carrier/restraint system of the present invention, showing the infant carrier connected to a base.

The convertible infant carrier/restraint system 20 of the invention is shown in FIG. 1 as including an infant carrier 22 and a detachable base 21. The convertible infant carrier/restraint system 20 is preferably used in one of three modes. First, the base 21 can be fixed in place on a seat of a motor vehicle, airplane, or the like, and arranged to receive and support infant carrier 22. When used in this mode, the infant carrier 22 is mounted on the fixed detachable base 21 while the infant (not shown) is traveling in the motor vehicle. In a second mode, the infant carrier 22 can be removed from the base 21 and used by itself to carry and transport the infant. In a third mode, the infant carrier 22 can be mounted directly on a motor vehicle seat while the infant is traveling in the motor vehicle to permit travel in the motor vehicle with the infant when the base 21 is not conveniently accessible. When the infant carrier 22 is mounted on the motor vehicle seat (either directly or via the fixed base 21), the infant carrier 22 is positioned so that the infant faces rearwardly when held in the carrier 22.

Figure 2:
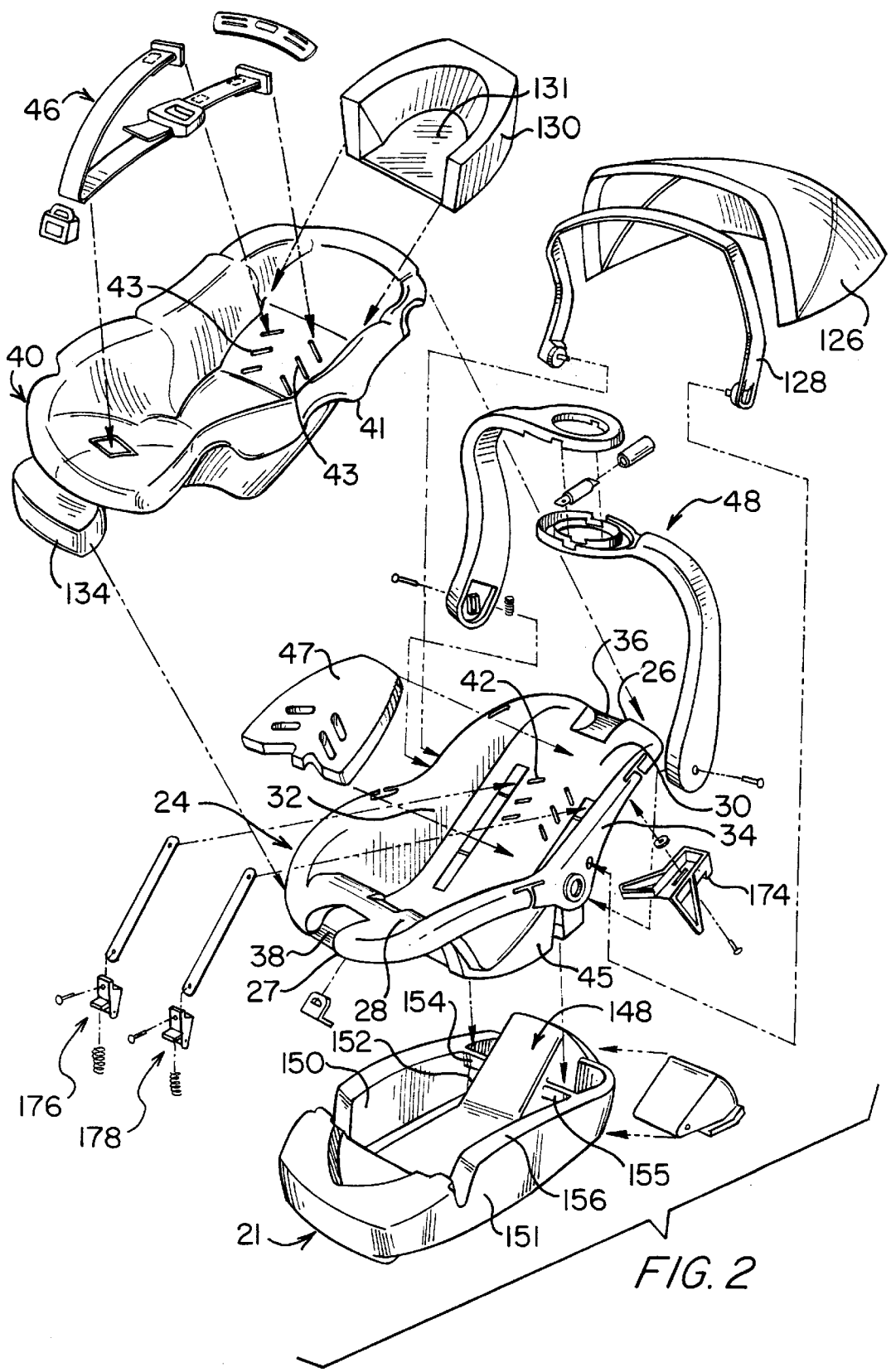
FIG. 2 is an exploded view of the convertible infant carrier/restraint system of FIG. 1.
Figure 12:
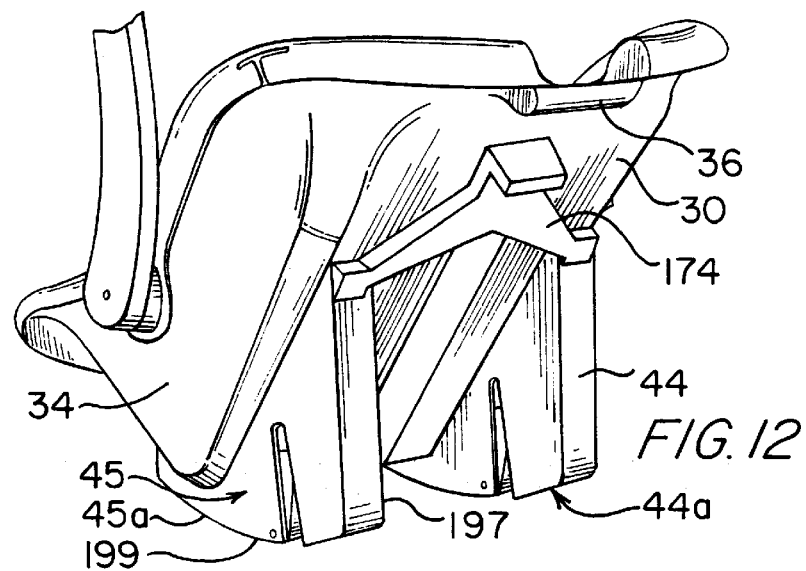
FIG. 12 is a rear perspective view of the convertible infant carrier of FIG. 1, showing the release handle and carrier support members on the back portion of the shell of the carrier.

As shown best in FIG. 2, the infant carrier 22 includes a main body portion or shell 24 extending from a head end 26 to a foot end 27. The shell 24 is sized and shaped to comfortably receive an infant therein, and includes a seat portion 28, a back portion 30, and laterally opposed first and second side walls 32 and 34 extending along the seat and back portions 28 and 30, to restrain the infant against lateral movement. A generally semi-circular recessed handle 36 (shown in FIG. 2) is formed at the head end 26 and a second similar handle 38 (FIG. 2) is formed at the foot end 27 of the shell 24 to provide convenient and comfortable hand holds for manipulating the infant carrier 22 into place on the detachable base 21 or for carrying the carrier 22 without using the handle assembly described in detail below. The shell 24 further includes a pair of vertical carrier support members 44 and 45 located in spaced-apart parallel relation on opposite sides of the bottom surface of the shell 24, as best seen in FIG. 12. Support members 44 and 45 are used to connect the shell 24 to the base 21. The bottom surfaces of support members 44 and 45 are contoured so that when the infant carrier 22 is placed on a flat surface, the carrier 22 can be rocked to pacify an infant held within the carrier 22. Infant carrier 22 is preferably formed of a rigid plastic material, such as polyethylene, although other suitable materials may be used as well.

The infant carrier 22 includes a removable fabric cover 40 (seen best in FIG. 2) lining the top surface of the shell 24 upon which the infant may be placed for greater comfort. The fabric cover 40 is composed of a suitable material, such as cotton, for direct contact with the skin and clothing of the infant. Preferably, the fabric cover 40 is padded. The fabric cover 40 is formed to cover the upper surfaces of the shell 24. The outer edges 41 of the fabric cover 40 may be bordered by a fabric binding (not shown) stitched thereto for reinforcement and durability purposes. Alternatively, or in addition, the outer edges 41 may comprise an elastic material to yieldingly hold the fabric cover 40 onto the shell 24.

A series of pairs of elongated apertures 42 extend through the shell 24, and corresponding apertures 43 extend through the fabric cover 40, to receive belt members of an adjustable infant restraint belt system 46, which will be described in more detail below. Preferably, a resilient back support pad 47 is disposed between the back portion 30 of the shell 24 and the fabric cover 40 to provide greater comfort for the infant.

A pivotable handle assembly 48 is coupled to side walls 32 and 34 of the shell 24 to facilitate transport of the infant carrier 22. The handle assembly 48 includes a generally U-shaped handle section 50, as shown in FIG. 1. Handle section 50 may comprise two leg members 52 and 54, each of which include a substantially circular end portion 56 and 58, respectively, and a locking mechanism described in more detail below. Leg members 52 and 54 extend upwardly from their respective end portions and are connected at their distal ends by a transverse bar member 60. In the embodiment shown in FIG. 1, the transverse bar member 60 of the handle section 50 includes a large, circular or generally oblong opening 62 having a handgrip 64 disposed therein. The handgrip 64 is transversely positioned between the two longitudinal sides of the opening 62 such that the axis of the handgrip substantially coincides with the longitudinal axis of the centerline between the two side walls 32 and 34 of the shell 24. The handgrip 64 is sized and shaped to receive a hand of an adult user (not shown). Preferably, the handgrip 64 includes a soft, durable fabric or foam cushion 66 to provide comfort for the adult user. During operation in the carrying mode, the user carries the infant carrier 22 by grasping the handgrip 64. This allows the palm of the user's hand to face inwardly toward the user's body in a comfortable and natural position, such as when carrying a suitcase or briefcase.

When viewed in cross-section, each of leg members 52 and 54 and transverse bar member 60 of handle section 50 have a generally rectangular or "eye-glass" appearance (i.e., a generally rectangular structure wherein one longitudinal side has a recessed midsection) so as to provide a comfortable "no-edge" construction. This "no-edge" construction is particularly important when the infant carrier 22 is being supported or carried in an alternate carrying position. Such alternate carrying positions include, for example, carrying positions wherein the user grasps one or both of leg members 52 and 54, or supports the transverse member 60 on his or her forearm or within the bend of the elbow. In these latter positions, the weight of the infant carrier 22 and occupant is distributed across the lower surface(s) of the handle section 50, rather than between two vertical side walls of the handle as is common with prior art designs. As can be appreciated, the infant carrier 22 of the present invention provides substantial comfort to the adult user when operating in an alternate carrying mode.

The handle assembly 48 (excluding the locking mechanism, discussed below) may be formed as a single unitary structure, for example, by blow-molding a dense polymeric foam or plastic material, such as polypropylene, as is well known in the art. Alternatively, to simplify construction and reduce manufacturing costs, the handle assembly 48 may be formed of pairs of substantially identical or complementary sections which can be coupled by any of a variety of methods known in the art. For example, leg members 52 and 54 may be comprised of mirror-image leg portions and complementary distal sections which form the opening 62 on the transverse bar member 60, as illustrated in FIG. 2. The complementary sections may be coupled by suitable fasteners, for example, using a plurality of screws, also as shown in FIG. 2.

The handle assembly 48 further includes a mechanism for locking the handle section 50 in two predetermined positions with respect to the shell 24. It should be understood that the locking mechanism for the handle assembly 48 is substantially identical for each of the end portions 56 and 58, and the mechanism will therefore be described with reference to the end portion 56 and the cooperating structure on the side 34 of the shell 24.

Figure 3:
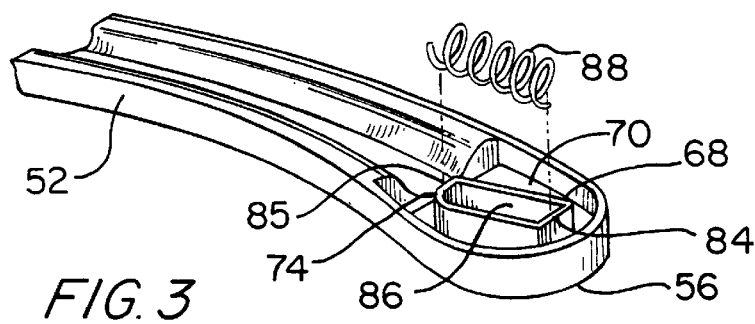
FIG. 3 is a perspective view showing the detent portion of a handle actuation mechanism of FIG. 1.

Referring to FIG. 3, the mechanism for locking the handle section 50 in position generally includes a detent member 68 protruding upwardly from an inside surface 70 of the handle end portion 56, and a recess portion 72 (FIG. 7) defined in the side 34 of the shell 24. The detent member 68 is formed as a generally rectangular element having an angled camming surface 74 formed at an upper corner thereof.

Figure 6:
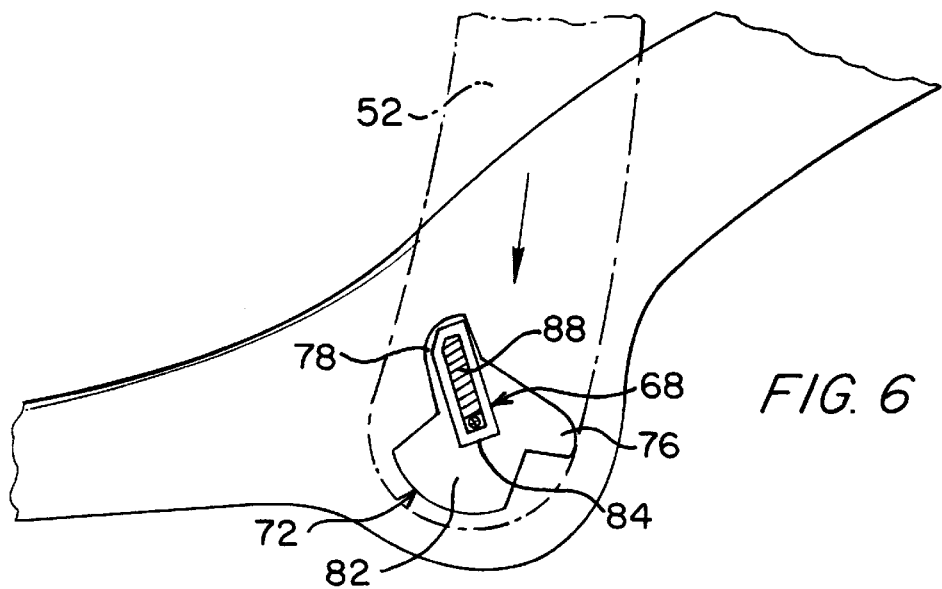
FIGS. 4–6 are diagrammatic views of the movement of the handle actuation mechanism relative to cooperating surfaces on the sides of the shell assembly of the carrier of FIG. 1.
Figure 5:
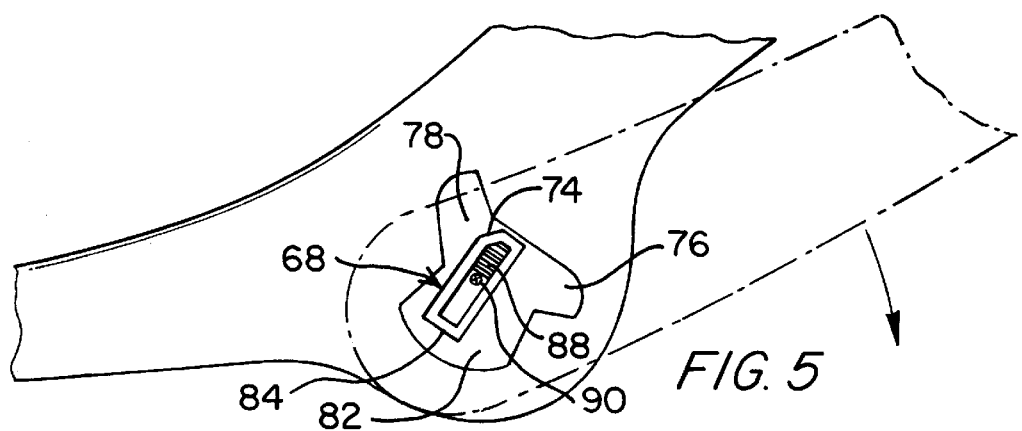
Figure 4:
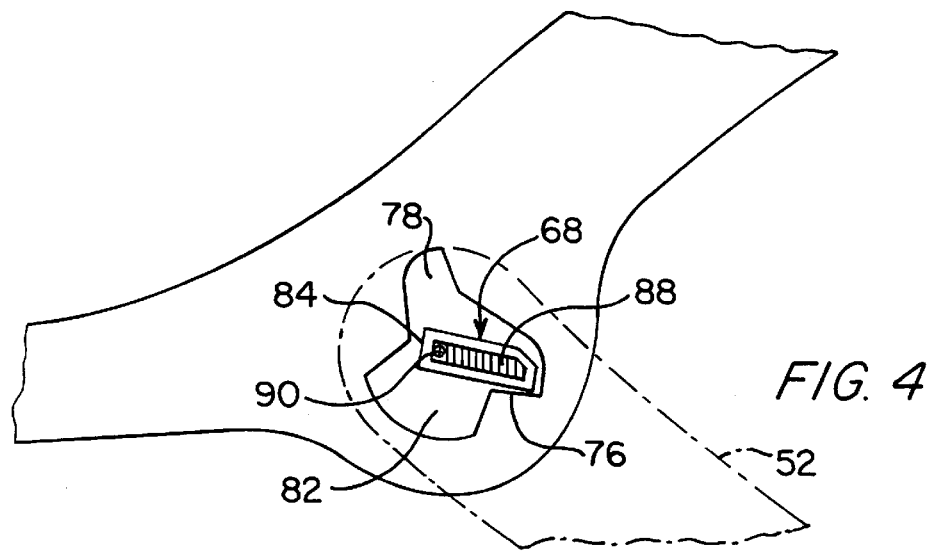

As shown best in FIGS. 4–6, the recess portion 72 includes a first recess area 76 and a second recess area 78 wherein the recess areas 76 and 78 each define a width which is substantially equal to or slightly greater than the width of the detent member 68, and the recess area 76 includes an angled camming surface 80 (not shown) for engaging the angled camming surface 74 of the detent 68. A third larger recess area 82 is provided below the first and second recess areas 76 and 78 for receiving a lower portion 84 of the detent 68.

As may be seen in FIG. 3, the detent 68 includes an interior slot 86 having a compression spring 88 therein. An upper end of the spring 88 abuts an upper wall 85 of the slot 86 and a lower end of the spring abuts a pivot pin 90 (FIG. 4) which extends from a location within the slot 86 and through an aperture formed within the recess portion 72 (FIG. 7) of the side 34. Thus, the handle end portion 56 is mounted for movement along the length of the detent 68 in a direction perpendicular to the longitudinal axis of the pin 90, as well as for pivotal movement about the pin 90.

Figure 7:
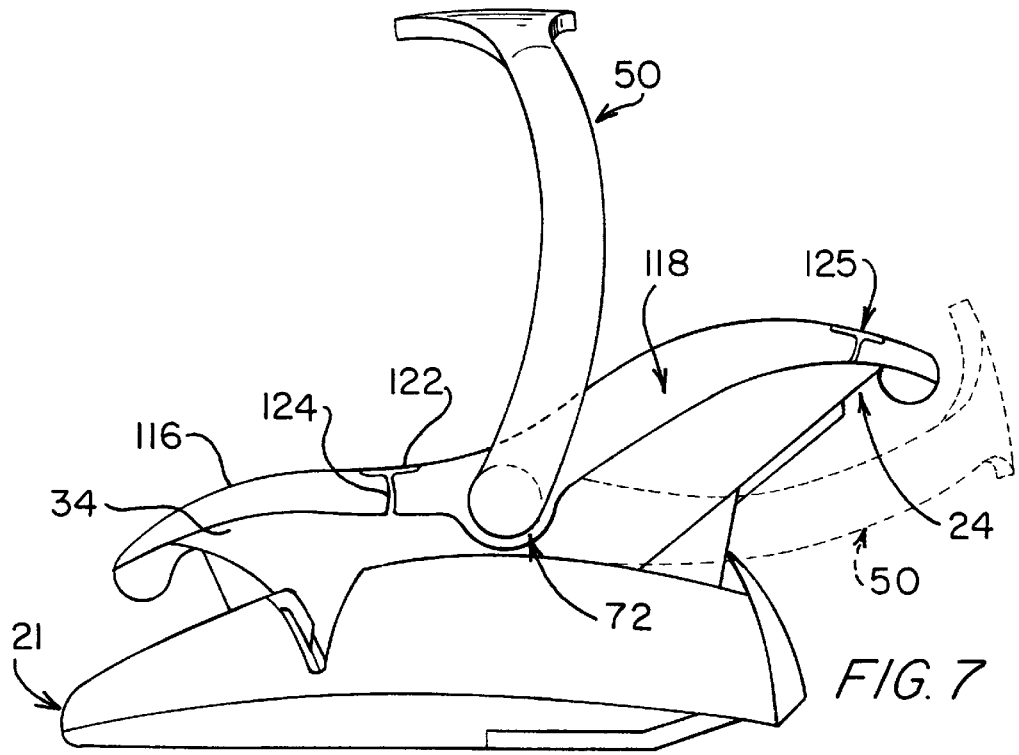
FIG. 7 is a side perspective view of the infant carrier/restraint system of FIG. 1, showing the handle positioned above the infant carrier (solid lines) for use in the carrying mode, and behind the back portion of the shell (in phantom) for use in a non-carrying mode.

Referring to FIGS. 4–6, the detent 68 is shown in FIG. 4 positioned in the first recess area 76 to locate the handle 50 in a first position with the leg member 52 located behind the back portion 30 of the shell 24 (handle 50 shown in phantom in FIG. 7). It should be apparent that the spring 88 acts between the detent 68 and the pin 90 such that the detent moves firmly into engagement within the recess area 76. The handle 50 may be located within the first position when the infant carrier 22 is used in its non-carrying modes of operation.

When it is desired to move the handle 50 from its first position to a second position where the leg member 52 is located directly above the cavity of the shell 24, a force may be applied to leg member 52 in the direction of the pivot axis defined by the pin 90 such that the spring 88 is compressed and the handle may be pivoted upwardly until the detent 68 is engaged within the second recess area 78, as illustrated in FIG. 6. In the second position of the handle 50, the handle 50 may be used to carry the infant carrier in a conventional manner.

When it is desirable to move the handle 50 back to its first position, it is necessary to push downwardly on the handle 50 such that the lower portion 84 of the detent 68 moves down into the third recess area 82 until the detent 68 is clear of the second recess area 78 and may be pivoted back downwardly into the first recess area 76. It should be apparent that the third recess area 82 provides the clearance area required for the lower portion 84 of the detent to move downwardly during compression of the spring 88 for movement between the first and second positions. From the above description, it should be apparent that the present infant carrier provides a unique and simple mechanism for permitting the handle to be locked in one of two operable positions.

Figure 8:
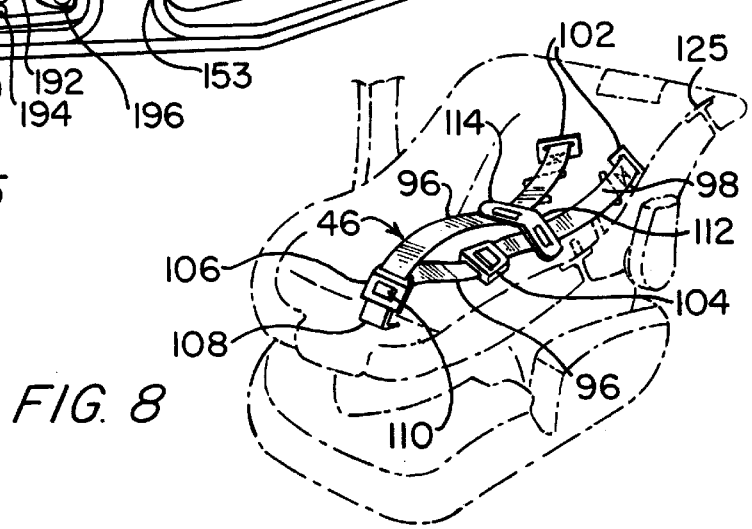
FIG. 8 is a perspective view of the infant carrier/restraint system of FIG. 1, showing the infant restraint belt system of the invention, with the infant carrier shown in phantom.

An adjustable infant restraint belt system 46, best seen in FIG. 8, is provided to restrain an infant seated in the infant carrier 22. The adjustable infant restraint belt system 46 is described in detail in copending U.S. patent application Ser. No. 08/736,971, entitled "High-Back Child Restraint System," the disclosure of which is incorporated by reference herein. The infant restraint belt system 46 includes a main belt 96 and a shoulder belt 98. Each of the belts 96 and 98 has a belt slide 102 attached to one end thereof by threading the belt through the belt slide 102, folding the belt back, and stitching it to itself. Each belt slide 102 is rectangular and includes a cross piece therein which the belt is looped around. Each belt slide 102 can be turned on end and inserted through one of the elongated apertures 43 on the fabric cover 40, and corresponding elongated apertures 42 on the shell 24, and turned around to be retained on the back side of the shell 24 adjacent to the opening 43. One end of each of the main belt 96 and shoulder belt 98 is inserted through corresponding openings 42 and 43 for a desired height of the infant restraint belt system 46 on the back portion 30.

The shoulder belt 98 terminates at an opposite end from its end with the belt slide 102 with a mid-belt adjuster 104, such as is available from Indiana Mills and Manufacturing, Inc., of Westfield, Ind. The mid-belt adjuster 104 receives the opposite end of the main belt 96 from the end of the main belt 96 with the belt slide 102. The mid-belt adjuster 104 is a device which allows the effective length of the main belt 96 to be adjusted. Because the mid-belt adjuster 104 is adapted to be positioned over the front torso area of the infant, it is readily accessible to the adult user. The infant carrier/restraint system of the present invention thus provides a restraining system which is easily and conveniently adjustable from the front.

Before the main belt 96 is attached to the shoulder belt 98 via the mid-belt adjuster 104, the main belt 96 connects first to the latch plate 108 via a receptacle or buckle member 106 and then terminates at the mid-belt adjuster 104. The buckle member 106 includes a release button 110 thereon which releases the buckle member 106 from the latch plate 108, in a manner well known in the art. Thus, the infant restraint belt system 46 can be used to restrain an infant seated in infant carrier 22 and complementary buckle member 106 and latch plate 108 can be disengaged to release the infant therefrom. Lastly, the shoulder belt 98 includes a slidable belt link 112 which is retained thereon and has an open sleeve 114 thereon to selectively be attached to the main belt 96 in the vicinity of the infant's chest and hold the two belts 96 and 98 in an adjacent position.

As can be appreciated, adjustment of the mid-belt adjuster 104 has the effect of tightening or loosening belts 96 and 98 in the system 46, due to the looped and interconnected nature thereof. Moreover, the main belt 96 and shoulder belt 98 can be lengthened or shortened depending upon the choice of openings 42 and 43. In this manner, the infant restraint belt system 46 can be adjusted to most appropriately fit the particular infant occupying the infant carrier 22.

Figure 9:
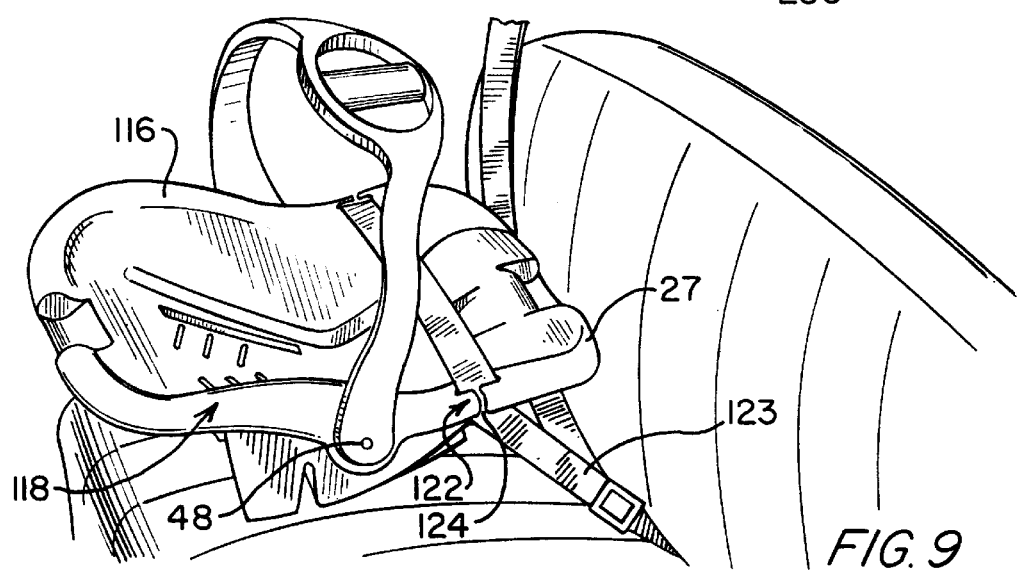
FIG. 9 is a perspective view of the infant carrier/restraint system of FIG. 1, showing the infant carrier secured by seat belts to the seat of a motor vehicle in a rear facing position for use by an infant.

Referring now to FIGS. 7 and 9, the infant carrier 22 is formed to include a top wall 116 approximately perpendicular to the side walls 32 and 34 and extending along the entire circumference of the shell 24. A downwardly extending lip 118 is integrally attached to the top wall 116 along the circumference of the top wall 116 to form a downwardly facing channel about the perimeter of the shell 24. The top wall 116 of the shell 24 is formed to include a pair of longitudinally extending slots 122 located at approximately equidistance between the handle assembly 48 attachment site and the foot end 27 of the shell 24. The slots 122 are sized and shaped to receive a conventional vehicle seat belt 123, and include openings 124 for access in and out of the slots 122. The openings 124 are sufficiently small so that once the vehicle seat belt 123 is threaded through the opening 124 and placed in the slot 122, the seat belt 123 is not easily removed from the channel without rethreading it through the opening 124. The vehicle seat belt 123 is passed through the slots and across the top of the carrier 22 when the carrier 22 is mounted directly on the seat of the motor vehicle, i.e., when the base 21 is not conveniently accessible, as shown in FIG. 9. When the carrier 22 is used in conjunction with the base 21, the vehicle seat belt 123 is passed through the base 21 instead of through slots 122, as discussed more fully below. It should be noted that in either of these two operating modes, the infant carrier 22 is positioned so that the infant faces rearwardly toward the seat back of the motor vehicle. Moreover, when used in motor vehicles which include a sliding latch plate on the seat belt, the convertible infant carrier/restraint system of the present invention is used with a seat belt stabilizing or coupling mechanism, commonly referred to as a locking clip, installed on the vehicle seat belt 123 to prevent the lap belt and/or shoulder strap portion from slipping.

The infant carrier 22 may be formed to further include a pair of slots 125 on either side of the recessed handle 36 at the head end 26 of the shell 24, as shown in FIGS. 1, 7 and 8. Slots 125 are sized and shaped similar to slots 122 to receive a conventional vehicle seat belt 123. In this embodiment, a shoulder strap portion of the vehicle seat belt system is passed through the slots 125 and behind the head end 26 of the carrier 22 when the carrier 22 is mounted directly on the seat of the motor vehicle. It should be understood that it is the lap belt portion of the vehicle seat belt system that passes through the slots 122 of the shell 24 when the carrier 22 is mounted directly on the seat of the motor vehicle, as discussed above. Similarly, it is the lap belt portion of the vehicle seat belt system that passes through the base 21 when used in the base-dependent operating mode, as discussed elsewhere herein.

Figure 10:
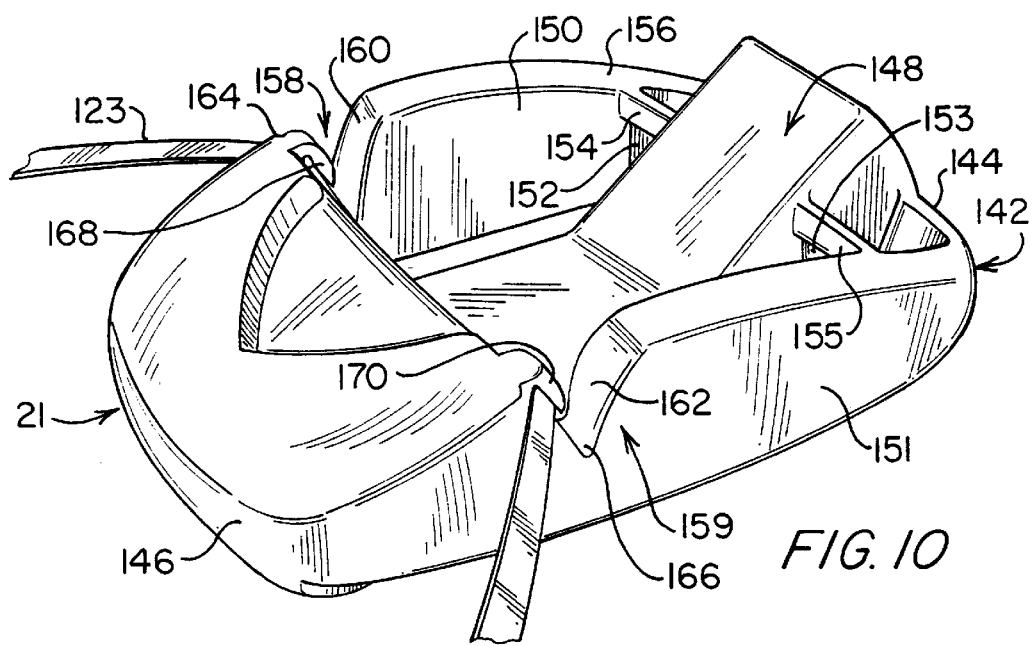
FIG. 10 is a perspective view showing the top surface of the detachable base of the infant restraint system of FIG. 1.
Figures 11, 13, 14:
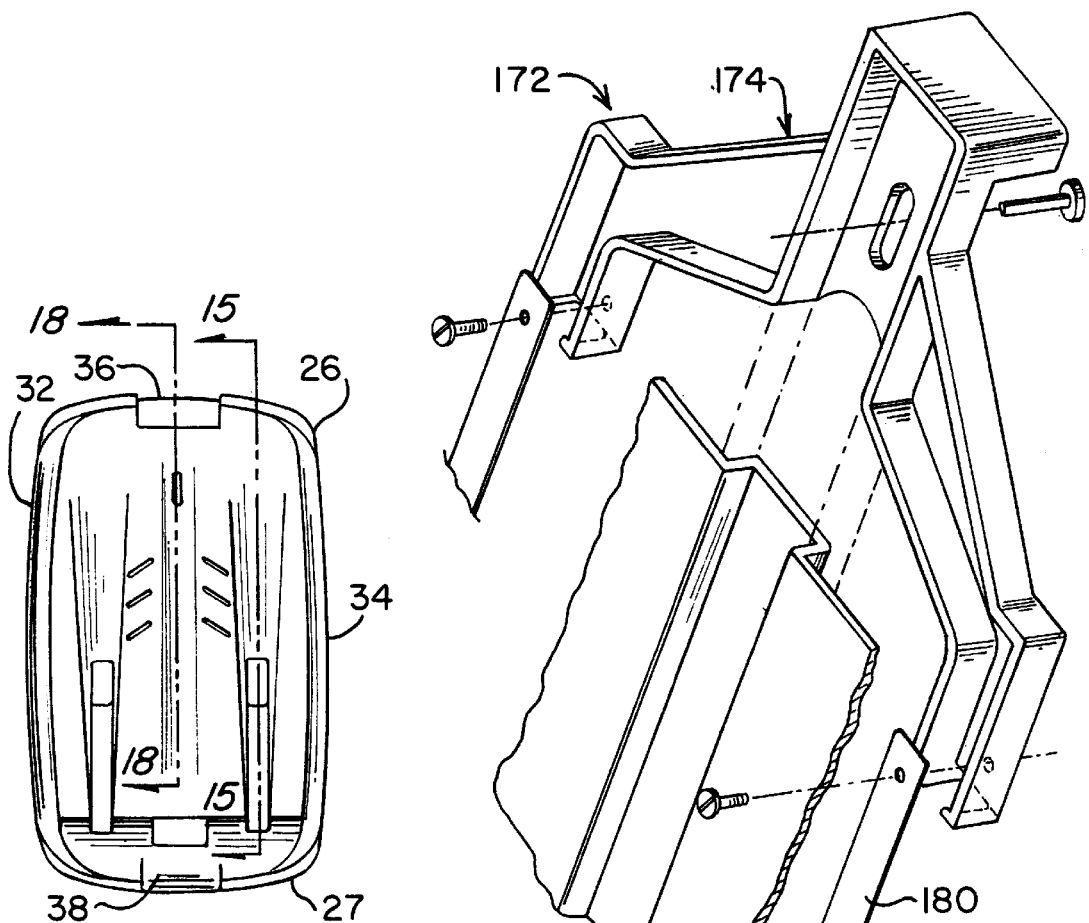
FIG. 11 is a partial perspective view of the base of FIG. 10, showing the head end of the base.
FIG. 13 is an exploded view of the base-carrier interlock mechanism in the infant carrier/restraint system of FIG. 1, showing the releasable latch assembly and a vertical panel of the base.
FIG. 14 is a top view of the infant carrier/restraint system of FIG. 1.

The convertible infant carrier/restraint system 20 includes a detachable base 21, best seen in FIGS. 10 and 11, which is configured to be mountable to the seat of a motor vehicle, airplane, or the like. The base 21 is preferably formed of a rigid plastic material, such as polyethylene. The base 21 includes a base shell 142 extending from a head end 144 to a foot end 146. The shell 142 is sized and shaped to receive the infant carrier 22 therein, and includes an angularly disposed back support 148, two conforming side walls 150 and 151, and two vertical panels 152 and 153 transversely disposed between the back support 148 and the conforming side walls 150 and 151, respectively. The vertical panels 152 and 153 include engagement surfaces 154 and 155, respectively, for engaging a releasable latch assembly on the carrier 22, as discussed in more detail below. The base 21 is formed to include a top wall 156 approximately perpendicular to the side walls 150 and 151 and extending along the entire circumference of the shell 142. The top wall 156 of the shell 142 is formed to include a pair of generally vertical slots 158 and 159 located near the foot end 146 of the shell 142, as best seen in FIG. 10. The slots 158 and 159 are formed as generally V-shaped openings having first angled surfaces 160 and 162, respectively, and opposed, second angled surfaces 164 and 166, respectively. The second angled surfaces 164 and 166 include belt hooks 168 and 170 formed therein. The vehicle seat belt is passed through the slots 158 and 159 and under belt hooks 168 and 170, as shown in FIG. 10. The seat belt is then buckled and tightened to secure the detachable base 21 to the seat of the vehicle.

To operate the infant carrier/restraint system 20 in the base-dependent transport mode, the infant carrier 22 is mounted on the fixed detachable base 21 by a spring-actuated interlock mechanism, as discussed more fully below. When mounted on the base 21, the infant carrier 22 substantially covers the slots 158 and 159 to form an enclosed seat belt channel. As can be appreciated, the slots 158 and 159 provide a convenient and easily accessible channel for passing the vehicle seat belt through the base 21 and securing the base 21 to the vehicle seat.

Referring now to FIGS. 12-15, the carrier 22 and the base 21 are detachably connected by an interlock mechanism including a releasable latch assembly 172 incorporated into the back portion 30 of the shell 24. The latch assembly 172 includes a bifurcated release handle 174 attached to a pair of latches 176 and 178 located inside the carrier support members 44 and 45, respectively, on the undersurface of shell 24. It should be understood that the latches 176 and 178 are substantially identical, and the interlock mechanism will therefore be described with reference to the latch 178, located in carrier support member 45 adjacent to the side 34 of the shell 24.

Figure 15:
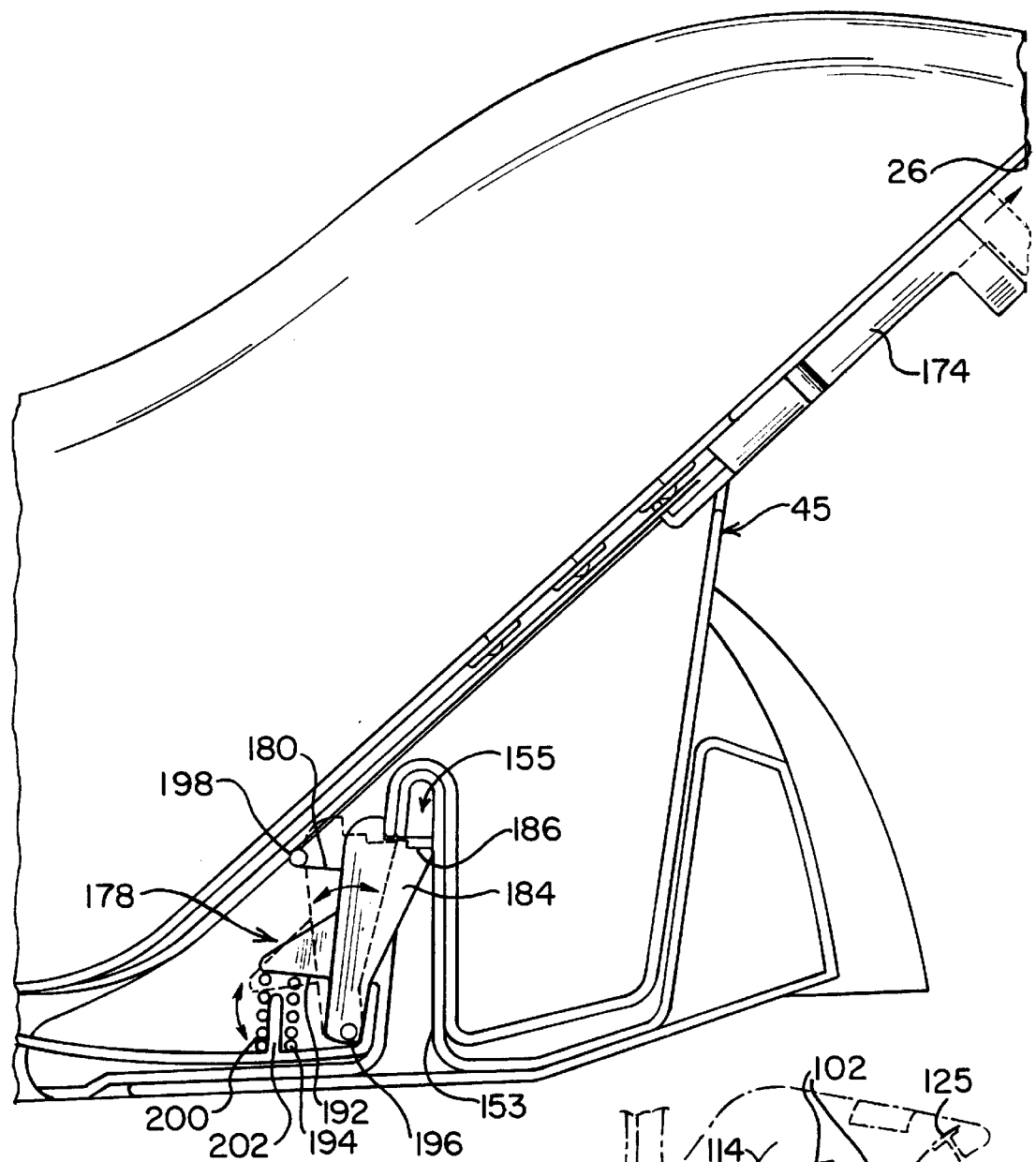
FIG. 15 is a cross-sectional view taken substantially along lines 15—15 of FIG. 14, showing the base-carrier interlock mechanism connecting the base and carrier together.

Referring to FIGS. 13 and 15, the mechanism for interlocking the carrier 22 and the base 21 generally includes the release handle 174 operatively connected with a latch 178 via a connecting strip 180, which is preferably formed from a thin piece of a nylon material. The latch 178 includes a pair of parallel opposing side arms 182 and 184. Defined within each of side arms 182 and 184 is an upper contacting surface 186 for engaging engagement surface 155 of vertical panel 153 on the base 21, and a lower contacting surface 192 against which a compression spring 194 abuts. The engagement surface 155 may include a rib structure, as shown in FIGS. 13 and 15, a protruding edge structure (not shown), or any other suitable structure for engaging the upper contacting surface 186. The latch 178 is pivotally connected to the base of support member 45 of the shell 24 by a pivot pin 196, as shown in FIG. 15. The pivot pin 196 extends laterally across the width of the latch 178 and through the two opposing side arms 182, 184 and the two opposing side walls 197, 199 (shown in FIG. 12) of the support member 45.

As can be seen in FIGS. 13 and 15, the connecting strip 180 partially encircles a stationary roller 198 disposed generally adjacent the upper portion of the latch 178. Pulling upon handle 174 pulls the connecting strip 180 upwardly, which pulls latch 178 toward the pivot pin 196. Thus, the latch 178 will pivot toward the foot end 27 of the shell 24 when subjected to a pulling force on the release handle 174.

The interlock mechanism further includes a detent member 200, which is integrally formed in an interior portion of the support member 45 and houses a compression spring 194 therein. The compression spring 194 is attached at the lower end to a spring-support post 202, formed within the interior surface of the support member 45. The detent member 200 is located on the side of the latch 178 closest to the foot end 27 of the shell 24 so that the spring 194 biases the latch 178 toward the head end 26 of the shell 24. Because the spring 194 is compressed between the detent member 200 and the lower contacting surface 192 of the latch 178, the latch 178 normally remains in the closed position with the upper contacting surface 186 resting against the engagement surface 155 of vertical panel 153 on the base 21.

To secure the infant carrier 22 to the fixed base 21, the user lowers the carrier 22 onto the base 21. The engagement surfaces 154 and 155 of vertical panels 152 and 153 in the base cooperate with latches 176 and 178 in the carrier members 44, 45 such that the lower contacting surfaces 192 compress the springs 194, thus actuating the release mechanism into the open position. Once the carrier 22 is properly positioned on the base 21, the compression springs 194 urge the latches 176 and 178 back to the normal closed position. When the carrier 22 is fully installed on the base 21, the spring-actuated latch assembly 172 functions to retain the latches 176 and 178 in the closed position thus locking the infant carrier 22 to the base 21.

To remove the infant carrier 22 from the base 21, the user pulls upwardly on the release handle 174 to pivot the latches 176 and 178 toward the foot end 27 of the carrier 22, thus positioning the latches 176 and 178 in the open position. The user may then lift the carrier 22 from the base 21.

From the above description, it should be apparent that the present infant carrier/restraint system provides a convenient and simple mechanism for securing and releasing the carrier to and from the base. The infant carrier/restraint system features a passive base engagement, wherein the user simply lowers the infant carrier into the base for quick connection. Moreover, unlike prior art designs, the removal of the carrier from the base requires a simple maneuver with one hand of the user. The releasable latch assembly 172 also provides a convenient mechanism for attaching the infant carrier to other devices, such as shopping carts and strollers.

Figure 18:
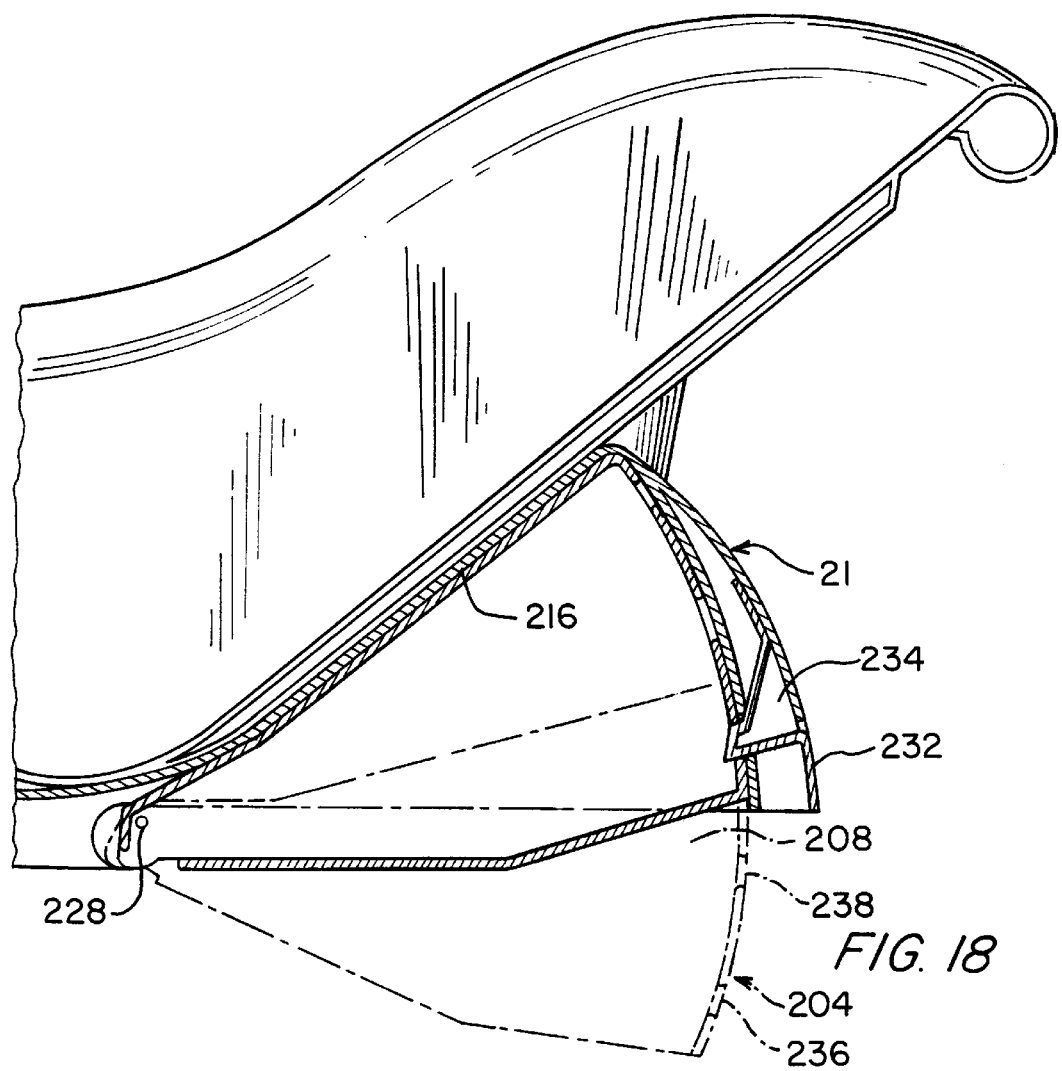
FIG. 18 is a cross-sectional view taken substantially along lines 18—18 of FIG. 14, showing the recline mechanism of the invention.
Figure 16:
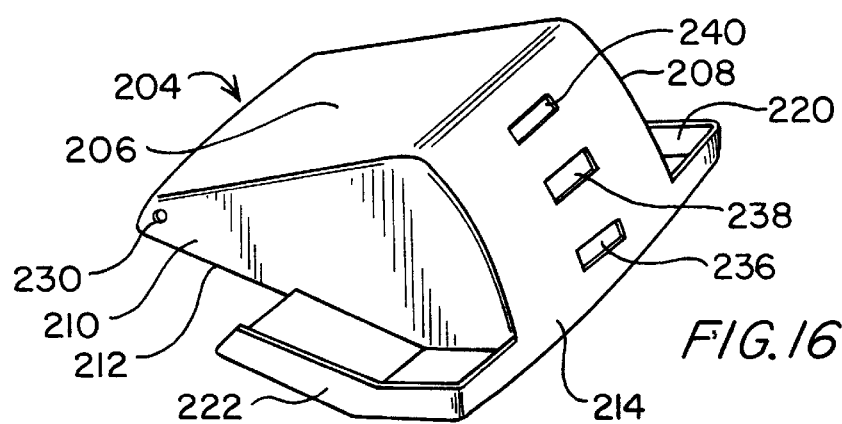
FIG. 16 is a perspective view of the recline stand in the recline mechanism of the invention.

The detachable base 21 further includes a mechanism operative to incline the infant carrier 22 in three predetermined angular orientations with respect to the base 21. Referring to FIGS. 16–18, the mechanism for adjusting the angle of inclination of the carrier 22 generally includes a recline stand 204 pivotally supported on the base. As best seen in FIG. 16, the recline stand 204 is formed as a generally wedge-shaped element having an angled upper support surface 206, laterally opposed side wall portions 208 and 210, a bottom wall 212, and a generally arcuate exterior wall portion 214 transversely disposed between upper support surface 206 and bottom wall 212. A generally wedge-shaped recess area 216 (FIG. 18) is formed in the bottom wall 218 of the base 21 at the head end 144 thereof. The recess area 216 is sized and shaped to receive the recline stand 204 in a nested relationship when the carrier 22 is supported in the fully reclined position, as shown in FIG. 17a.

Referring to FIG. 16, the recline stand 204 further includes a first flange 220 and a second flange 222 extending laterally from side wall portions 208 and 210, respectively, for stabilizing the base 21. The recline stand 204 is pivotally attached to opposing side walls of the recess area 216 of the base 21 by rivets (not shown) or similar members which extend through apertures 228 and 230 at the corners of side wall portions 208 and 210 opposite exterior wall portion 214, and through corresponding apertures (not shown) formed within the side walls of recess area 216. Thus, the base 21 is attached to the recline stand 204 for pivotal movement about the rivets. The base 21 further includes a protruding handle portion 232 at the head end 144 thereof for manipulating the base 21 relative to the recline stand 204 to selectively position the carrier 22 in one of three predetermined angular orientations, discussed more fully below. The various angular orientations are achieved by selective engagement of a finger member 234, located adjacent to handle 232 on the base 21, with one of three vertically spaced slots 236, 238, and 240 (shown in FIG. 16) on the exterior wall portion 214 of the recline stand 204.

Figure 17A:
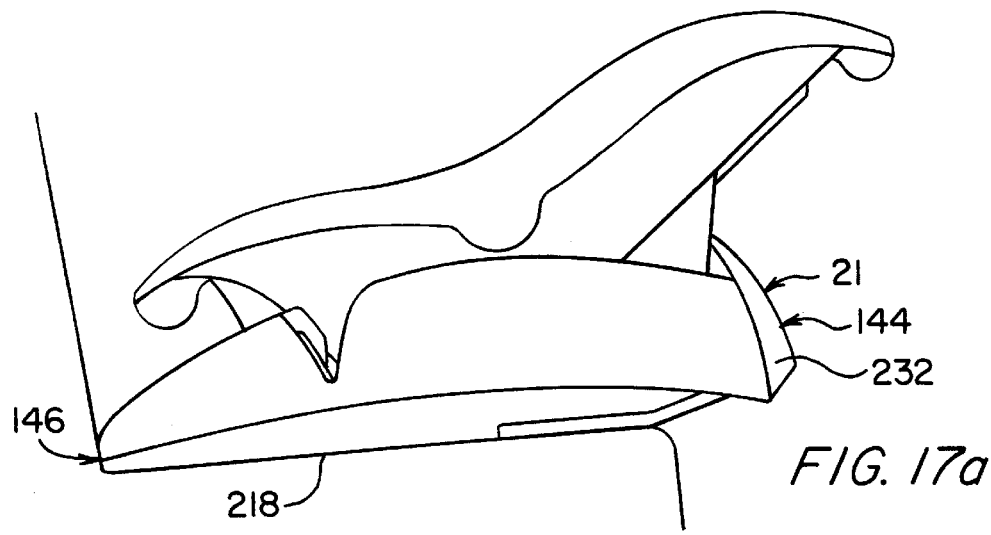
FIG. 17a is side view of the infant carrier/restraint system of FIG. 1, showing the infant carrier in the fully reclined position.
Figure 17B:
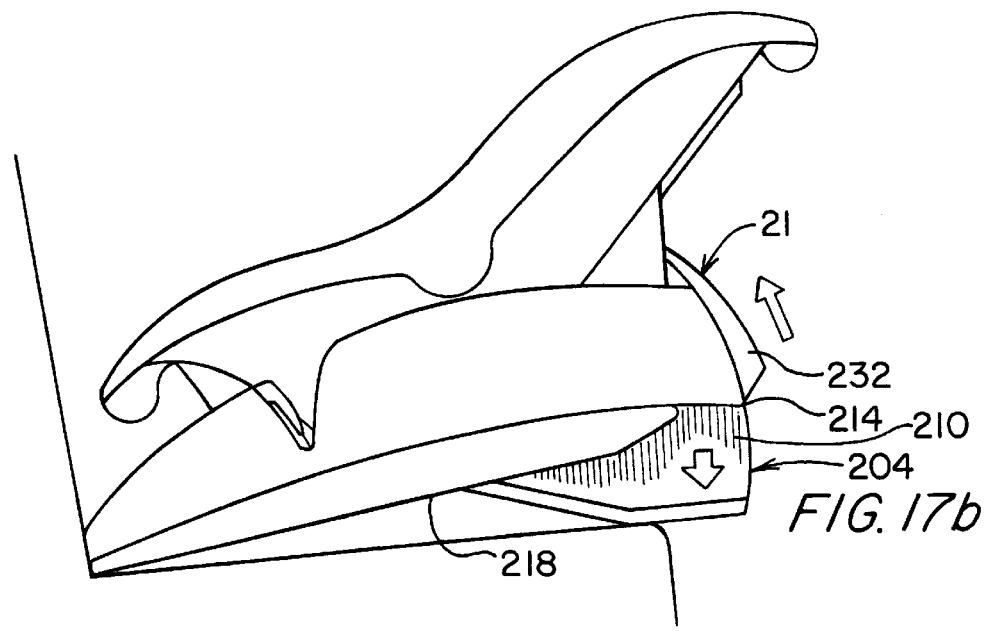

Referring to FIGS. 17*a* and 18, the recline stand 204 is shown substantially contained within the recess area 216 on the underside of base 21 to adjust the angle of the base 21 relative to the surface upon which it rests (and infant carrier 22 when installed on the base) in a first fully reclined position. When it is desired to adjust the incline angle of the carrier 22 to a second intermediate recline position, the user grasps the handle 232 on base 21 and elevates the head end 144 of the base 21 relative to the recline stand 204 to effect engagement of finger 234 within the intermediate slot 238. Similarly, when it is desired to adjust the incline angle of the carrier 22 to the most upright position, the user further elevates the head end 144 of the base 21 to engage finger 234 within upper slot 240, as shown in FIG. 17*b*. From the above description, it should be apparent that the invention provides a unique and simple mechanism for orienting the carrier in a plurality of angular incline positions by adjusting the angle upon which the base rests upon its support surface.

Figure 19A:
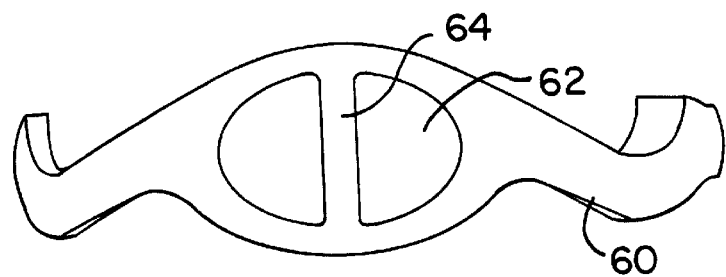
FIG. 19a through 19d are partial top views of the transverse bar member of the handle section of FIG. 1, showing alternate configurations for the handle opening and handgrip.
Figure 19B:
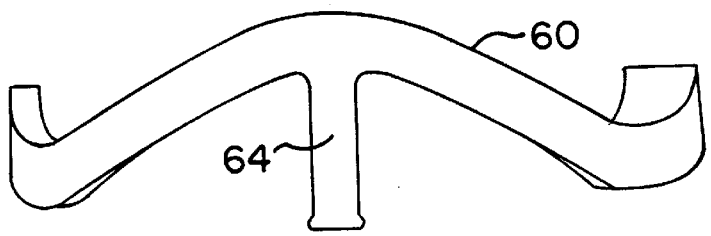
Figure 19C:
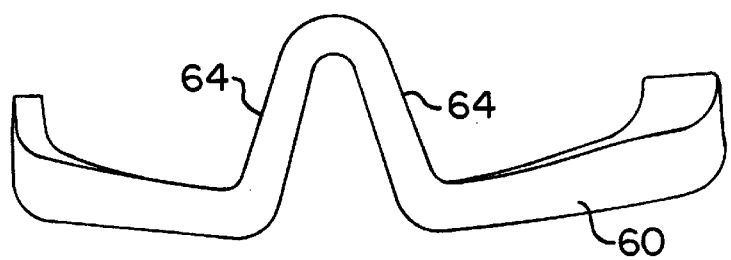
Figure 19D:
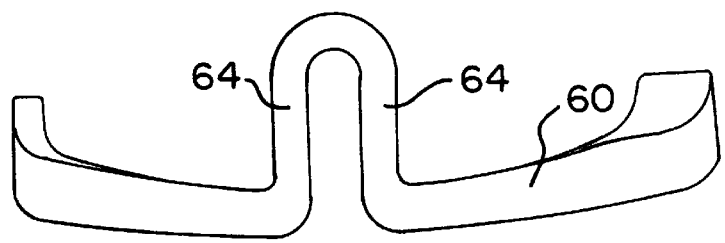

Many modifications of the present invention are possible and will be evident to those of ordinary skill in the art. For example, the transverse bar member 60 of the handle assembly 50 may include a variety of alternate configurations for the handle opening and handgrip 64, such as those exemplified in FIG. 19. Although the present invention can be practiced with a conventional handgrip, the handgrip 64 preferably is positioned such that the palm of the user's hand faces inwardly toward the user's body during operation in the carrying mode. Each of the exemplified designs provides this comfort feature. In addition, several of these designs (particularly those shown in FIGS. 19*c* and 19*d*) provide a plurality of grip locations on the transverse bar member 60, and thus offer the additional advantage of versatility. The design shown in FIG. 19*b* features the desirable handgrip orientation, but is supported from only one side, making this design particularly easy to grasp, especially by those with large hands. If desired, the user may also grasp the transverse bar member 60 on either side of the handgrip 64. The design shown in FIG. 19*c* offers a plurality of carrying positions, including the two handgrips 64, the junction between the two handgrips 64, and the transverse bar member 60 on either side of the handgrips 64. The design shown in FIG. 19*d* similarly offers a plurality of grip locations, including two handgrips 64 oriented at an angle perpendicular to the transverse bar member 60, which may be particularly comfortable for some users. Several of these designs, particularly FIG. 19*b*, also provide a convenient structure for suspending items above an infant in the carrier.

The infant carrier 22 may include a canopy 126 pivotally attached to side walls 32 and 34 of the shell 24 to protect the infant's face and head from environmental elements. The canopy 126 is appended to the lip 118 of the shell 24 at a location between the handle assembly 48 attachment site and the head end 26 of the shell 24. The canopy 126 is attached to the shell 24 via a detachable canopy stay 128, both shown in an exploded view in FIG. 2. The canopy 126 and detachable canopy stay 128 are both known in the art.

To provide additional support and protection to the infant's head and neck area, the infant carrier 22 may include a head bolster 130, shown in FIG. 2. The head bolster 130 is sized and shaped to comfortably receive the infant's head when installed on the fabric cover 40 at the head end 26 of the carrier 22. The head bolster 130 includes a panel of fabric doubled over on itself and enclosing a generally U-shaped strip of padding therein. The head bolster 130 further includes a fabric back panel 131 which serves to secure the head bolster 130 in place during use by an infant. The head bolster 130 may be affixed to the carrier 22 by any suitable means known in the art including, but not limited to, tethers, Velcro-brand fastening devices, buttons, stitching, and the like. Preferably, the head bolster 130 includes a pair of tethers 132 attached thereto which can be inserted through apertures (not shown) located at corresponding positions on the shell 24 and fabric cover 40. The tethers 132 are tied together behind the back portion 30 to secure the head bolster 130 to the carrier 22.

As shown in FIG. 2, the infant carrier 20 may include a fabric infant cover 134 attached to the foot end of the fabric cover 40. The fabric infant cover 134 may be affixed at one end to the fabric cover 40 by any suitable means known in the art, such as by snaps, tethers, Velcro-brand fastening devices, buttons, stitching, and the like. Preferably, the fabric infant cover 134 is attached to the fabric cover 40 by snaps. During use, the infant cover 134 is unrolled and attached at an opposing end to an appropriate site on the fabric cover 40 by a detachable fastener. When not in use, the infant cover 134 is rolled up and secured to itself, preferably by a zipper or snap fastener, as is known in the art.

The foregoing description is considered as illustrative only of the principles of the invention. Furthermore, since numerous other modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. An infant restraint system, comprising:
    a support base;
    an infant carrier couplable to the base, the infant carrier having a head end and a foot end;
    a handle attached to the carrier; and
    a latching mechanism operatively disposed relative to the support base and the infant carrier to detachably connect the carrier to the base, said latching mechanism being independent of said handle, the latching mechanism having an actuating portion located on the carrier substantially proximate an uppermost edge of one of the head end and the foot end of the carrier, in a position to allow a user having two hands to actuate the actuating portion with one hand while simultaneously gripping the carrier at the head end and the foot end with respective ones of the user's two hands.

2. An infant restraint system as defined in claim 1, wherein said support base includes a latching engagement site, and wherein said latching mechanism includes a latching engagement member, said latching engagement member being pivotally mounted on the infant carrier and biased by a biasing member toward engagement with the latching engagement site on the base.

3. An infant restraint system as defined in claim 2, wherein said latching engagement member is biased toward an engaging position by the biasing member which comprises a spring member.

4. An infant restraint system, comprising:

a support base including a latching engagement site;

an infant carrier couplable to the base, the infant carrier having a head end and a foot end;

a handle attached to the carrier; and a latching mechanism operatively disposed relative to the support base and the infant carrier to detachably connect the carrier to the base, said latching mechanism being independent of said handle, the latching mechanism having an actuating portion located on the carrier substantially proximate an uppermost edge of one of the head end and the foot end of the carrier, the latching mechanism also including a latching engagement member, said latching engagement member being pivotally mounted on the infant carrier and biased by a biasing member toward engagement with the latching engagement site on the base;

wherein said latching engagement member is disposed on a central portion of the carrier, wherein said latching engagement site is disposed on a central sire of the base, and wherein said actuating portion of the latching mechanism is coupled to said latching engagement member to allow the latching engagement member to be actuated by the actuating portion.

5. An infant restraint system, comprising:

a support base, wherein the support base includes a latching engagement site disposed on a central portion of the base;

an infant carrier couplable to the base;

a handle attached to the carrier; and a latching mechanism operatively disposed relative to the support base and the infant carrier to detachably connect the carrier to the base, the latching mechanism being independent of said handle, the latching mechanism having an actuating portion located on the carrier at one of the head end and the foot end of the carrier, and wherein the latching mechanism includes a latching engagement member disposed on a central portion of the carrier, the latching engagement member being pivotally mounted on the infant carrier and biased by a biasing member toward engagement with the latching engagement site on the base, and further wherein the actuating portion is coupled to the latching engagement member by an elongated, flexible coupling member to allow the latching engagement member to be actuated by the actuation portion.

6. An infant restraint system as defined in claim 5, wherein the coupling member is an elongated sheet of plastic.

7. An infant restraint system as defined in claim 6, the coupling member further including a second elongated, flexible coupling member.

* * * * *